Oct. 1, 1935.          R. H. MOULTON          2,015,759
SHOCK ABSORBER
Original Filed Aug. 20, 1930
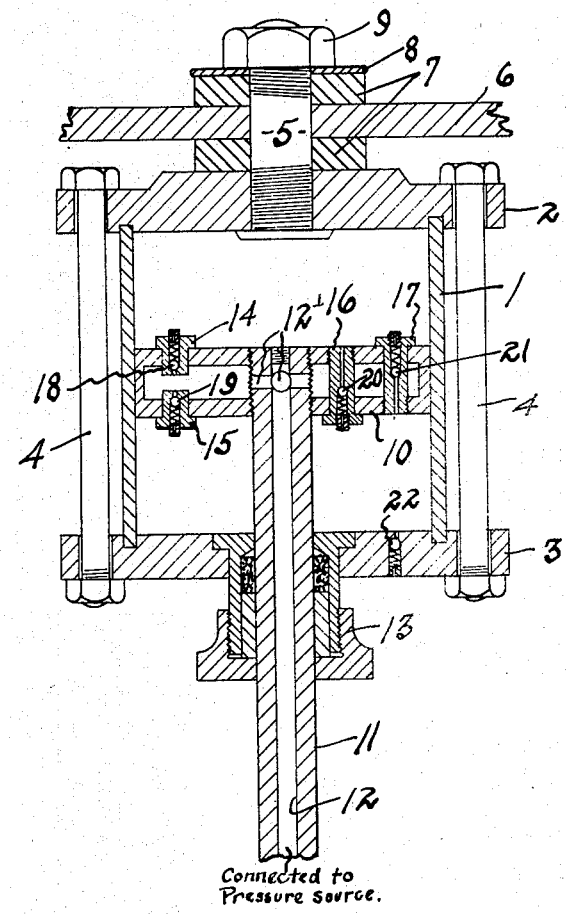
INVENTOR.
Rollin H. Moulton
BY Darby & Darby
ATTORNEYS.

Patented Oct. 1, 1935

2,015,759

UNITED STATES PATENT OFFICE 2,015,759

SHOCK ABSORBER

Rollin H. Moulton, Berwyn, Ill., assignor to National Pneumatic Company, New York, N. Y., a corporation of West Virginia Original application August 20, 1930, Serial No. 476,590. Divided and this application November 17, 1934, Serial No. 753,433

5 Claims. (Cl. 188—88)

This invention relates in general to improvements in shock absorbers and more particularly to that class of device adapted to be used on road vehicles, airplanes, track vehicles, or in fact between any parts having relative movement therebetween where it is desired to retard or cushion the movements between said parts.

The general object of this invention is to provide an improved, simplified form of shock absorber of the type adapted for use on heavy vehicles and the like and which is capable of providing efficient shock absorption both on the direct stroke and on the re-bound, or snubbing stroke.

A further object of this invention is to provide a shock absorbing device having a cylinder within which the pressure is always greater than atmospheric pressure and arranged to maintain a pressure sufficiently high so that there is no lost motion on the snubbing stroke.

These and many other objects as will appear from the following description, as well as those set forth in my copending application, Serial No. 476,590, filed August 20, 1930, of which this is a divisional application, are secured by means of this invention.

This invention resides substantially in the combination, construction, arrangement and relative location of parts, all as will be set forth in the following specification:

In the drawing, the single figure is a central, vertical, cross-sectional view of a shock absorber in accordance with this invention.

The device comprises the cylinder 1 held between the heads or end plates 2 and 3 by means of nuts and bolts 4 with a fluid tight seal provided as illustrated by means of grooves in the heads in which the ends of the cylinder seat. The head 2 is provided with a rigid stud 5 which engages with one of the relatively movable members, such as the chassis of an automobile as indicated at 6. The attachment thereto by means of the stud includes the rubber or other resilient blocks 7, the washer 8 and the nut 9. Within the cylinder is a hollow piston 10 having sliding contacts with the inner wall thereof and provided if desired with piston rings (not shown).

Secured to the piston is a piston rod 11 which extends through any suitable form of packing gland structure 13 mounted on the head 3. The piston rod 11 is provided with a longitudinal passage 12 therethrough which communicates with transverse passage 12' opening into a chamber within the piston. Mounted on the piston are the valve forming members 14 and 15 which have passages therethrough establishing communication between the chamber in the piston and the cylinder ends. Within these passages are the valve elements 18 and 19 shown in the form of balls. These valve elements 18 and 19 are held on their seats by means of springs, the pressure of which may be adjusted by means of aperture plugs as shown. It will be noted that valves 18 and 19 seat in opposite direction. Likewise mounted on the piston and extending entirely therethrough, are the valve members 16 and 17 which have longitudinal passages extending entirely therethrough so as to interconnect the cylinder ends. These passages are normally closed by means of the valve elements 20 and 21 illustrated in the form of balls. These valve elements are normally held seated by means of springs, the tension of which will be adjusted by means of aperture plugs. It will be noted that the valve elements 20 and 21 also seat in opposite directions. The head 3 is provided with a passage therethrough in which the valve element 22, likewise in the form of a ball, is mounted. This ball is normally held seated by means of a spring, the tension of which may be adjusted by means of an aperture plug.

In the operation of this device the passage 12 in the piston rod is connected to a suitable fluid pressure source such as the air-brake system of a vehicle for example, by means of any suitable connection such as flexible hose not shown. Thus, air under pressure is supplied from the source to the chamber in the piston through passages 12 and 12'. Air escapes from the chamber in the piston to the opposite end of the cylinders by unseating the valve elements 18 and 19. The parts are shown in the normal position attached to a vehicle for example, with the stud 5 attached to the chassis 6, and the piston rod 11 attached to the axle by any well known means not shown. If the vehicle strikes an obstruction the piston 10 moves upwardly compressing the air in the upper end of the cylinder, further insuring the seating of valve element 18. If the upper movement of the piston sufficiently rarifies the air in the cylinder below it, additional air will be supplied from the chamber in the piston through the valve element 15 by unseating valve element 19. If the shock is sufficiently violent so that the pressure in the upper end of the cylinder exceeds the predetermined value, air will escape from the upper end of the cylinder to the lower end through valve member 16 by unseating valve element 20. On the return stroke additional air will be supplied above the piston by the unseating of valve element 18 if the pressure therein falls below a predetermined value. Likewise if the snubbing action is sufficiently violent, air will discharge from the lower end of the cylinder to the upper end through valve member 17 by unseating valve element 21. If the snubbing action is exceedingly violent so that the pressure in the lower end of the cylinder builds up sufficiently high, valve element 22 will be unseated so that some of the air in the lower end of the cylinder will be vented to the atmosphere.

It will be apparent from the form of device as described above, and for the purpose of illustrating to those skilled in the art, that this invention may well assume other physical forms without departure from the scope of the invention. I do not, therefore, desire to be strictly limited to the disclosure as given for purposes of illustration but rather to the scope of the appended claims.

What I seek to secure by United States Letters Patents is:

1. In a shock absorber, the combination of a cylinder, a hollow piston disposed therein, a hollow piston rod secured to said piston and communicating therewith, said piston rod extending outwardly of cylinder, valves in said piston for by-passing fluid from one side of said piston to the other after a predetermined pressure has been reached in the side of said cylinder toward which said piston is traveling, and additional valves in said piston each communicating with said piston and an adjacent end of said cylinder for conducting fluid to said cylinder upon a predetermined reduction of fluid pressure in the end of said cylinder from which said piston is traveling.

2. A shock absorber as described comprising a cylinder, a piston in said cylinder having a chamber therein, a piston rod attached to said piston and extending outwardly of said cylinder, said piston rod having a passage therein communicating with the chamber in the piston and adapted to supply fluid under pressure thereto and valve means on said piston for establishing communication between the ends of the cylinder and the chamber in the piston whereby the pressure in the cylinder ends is maintained at a predetermined value above atmospheric pressure.

3. A shock absorber as described comprising a cylinder, a piston in said cylinder having a chamber therein, a piston rod attached to said piston and extending outwardly of said cylinder, said piston rod having a passage therein communicating with the chamber in the piston and adapted to supply fluid under pressure thereto, valve means on said piston for establishing communication between the ends of the cylinder and the chamber in the piston whereby the pressure in the cylinder ends is maintained at a predetermined value above atmospheric pressure, said valve members seating in opposite directions and including means for holding them seated so as to open under only predetermined relative pressure conditions between the ends of the cylinders and the chamber in the piston.

4. A shock absorber as described comprising a closed cylinder having a hollow piston therein, a piston rod connected to the said piston and extending outwardly of said cylinder, said piston rod having a passage communicating with the interior of the hollow piston, valve means mounted on said piston for supplying fluid pressure to both ends of the cylinder from the interior of the piston and oppositely seating valves mounted on said piston for by-passing fluid pressure from either end of the cylinder to the other when the respective pressures therein exceed a predetermined value.

5. A shock absorber as described comprising a closed cylinder having a hollow piston therein, a piston rod connected to the said piston and extending outwardly of said cylinder, said piston rod having a passage communicating with the interior of the hollow piston, valve means mounted on said piston for supplying fluid pressure to both ends of the cylinder from the interior of the piston, oppositely seating valves mounted on said piston for by-passing fluid pressure from either end of the cylinder to the other when the respective pressure therein exceeds a predetermined value, and valve means at one end of the cylinder for venting fluid pressure to the atmosphere.

ROLLIN H. MOULTON.